United States Patent [19]

Komiya

[11] Patent Number: 4,616,885
[45] Date of Patent: Oct. 14, 1986

[54] DUST-FREE ROLLING-CONTACT BEARING ASSEMBLY

[75] Inventor: Yoshiyuki Komiya, Kawasaki, Japan

[73] Assignee: Nippon Thompson Co., Ltd., Japan

[21] Appl. No.: 731,682

[22] Filed: May 7, 1985

[30] Foreign Application Priority Data

May 21, 1984 [JP] Japan ............................. 59-73231[U]

[51] Int. Cl.4 ............................................. F16C 29/08
[52] U.S. Cl. ......................................... 384/15; 384/49
[58] Field of Search ................. 308/3.5, 6 R, 3.8, 3 R, 308/6 C

[56] References Cited

U.S. PATENT DOCUMENTS

| 1,699,636 | 1/1929 | Smith | 308/3 R |
| 2,785,262 | 3/1957 | Bourns | 308/3.5 |
| 2,994,567 | 8/1961 | Liebmann | 308/3.5 |

Primary Examiner—Lenard A. Footland
Attorney, Agent, or Firm—Alan H. Macpherson; Steven F. Caserza; Kenneth E. Leeds

[57] ABSTRACT

A dust-free linear motion rolling-contact bearing assembly includes a track rail having a generally U-shaped cross section, a table having a generally inverted U-shaped cross section and received in the track rail and a plurality of rolling members interposed between the table and the track rail such that the table can move along the track rail freely. The present assembly also includes a pair of shielding plates each extending between one end of the table and the corresponding end of the track rail so that, as the table moves along the track rail, the shield plates keep the track rail covered at all times thereby preventing any undesired foreign matter, such as debris and dust, from getting into the assembly.

5 Claims, 8 Drawing Figures

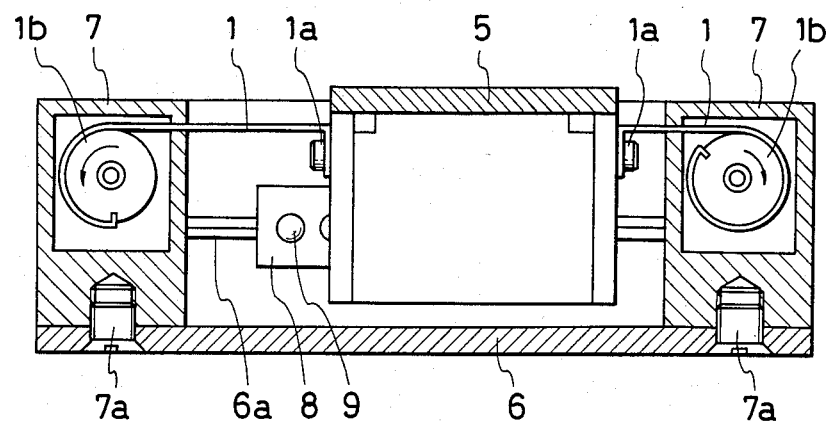
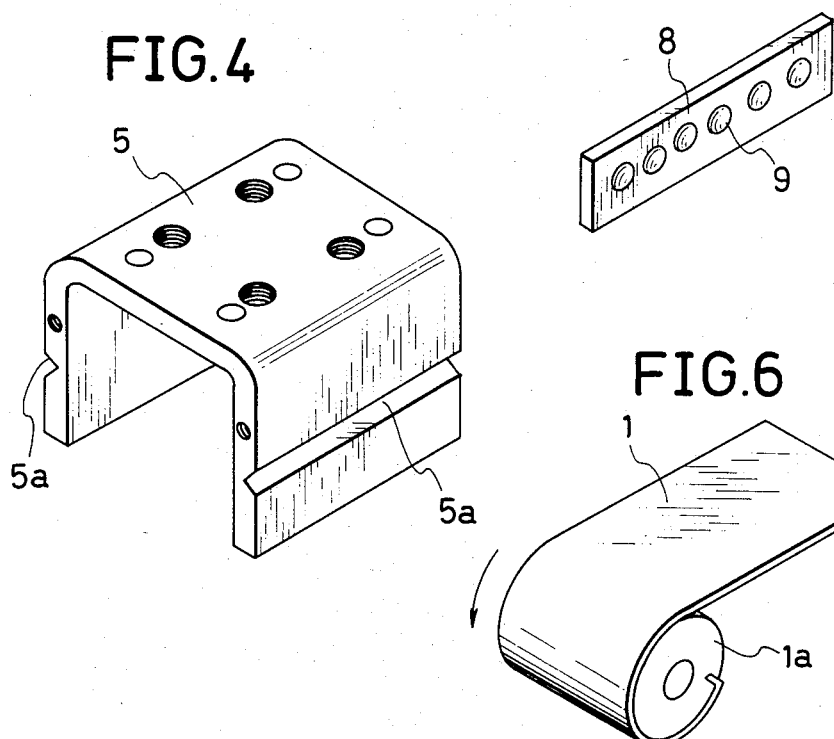
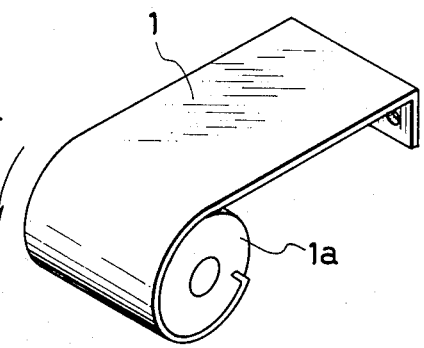

DUST-FREE ROLLING-CONTACT BEARING ASSEMBLY

BACKGROUND OF THE INVENTION

1. Field of the Invention

This invention relates to a rolling-contact bearing assembly, and, in particular, to a dust-free rolling contact bearing assembly for linear motion, which is so structured to prevent any undesired foreign material from getting into the assembly.

2. Description of the Prior Art

A linear motion rolling-contact bearing assembly is well known in the art. The linear motion rolling contact bearing assembly includes an elongated track rail, a moving table which is movable along the track rail and a plurality of rolling members interposed between the track rail and the moving table. The track rail is typically provided with outer guide grooves and the moving table is also provided with inner guide grooves and the rolling members are provided to roll along a guide passage defined by these inner and outer guide grooves. In such a linear motion rolling contact bearing assembly, since the track rail is substantially long as compared with the moving table so that the outer guide grooves of the track rail are normally exposed, which is sometimes disadvantageous because undesired foreign materials, such as debris and dust, may come to be deposited onto the outer guide grooves, which then could cause malfunctioning of the bearing assembly.

SUMMARY OF THE INVENTION

It is therefore a primary object of the present invention to obviate the disadvantages of the prior art as described above and to provide an improved dust-free rolling-contact bearing assembly.

Another object of the present invention is to provide a dust-free, linear motion rolling-contact bearing assembly which is reliable and stable in operation at all times.

A further object of the present invention is to provide a dust-free, linear motion rolling-contact bearing assembly which is so structured to prevent any unwanted foreign material, such as dust and debris, from getting into the assembly.

Other objects, advantages and novel features of the present invention will become apparent from the following detailed description of the invention when considered in conjunction with the accompanying drawings.

BRIEF DESCRIPTION OF THE DRAWINGS

FIG. 3 is a longitudinal, cross-sectional view of the structure shown in FIG. 1;

FIG. 4 is a perspective view showing the table 5 provided in the bearing assembly shown in FIG. 1;

FIG. 5 is a perspective view showing the ball sub-assembly provided in the bearing assembly shown in FIG. 1;

FIG. 6 is a perspective view showing a spring-biased shielding structure provided in the bearing assembly shown in FIG. 1;

DESCRIPTION OF THE PREFERRED EMBODIMENTS

Figure 1:
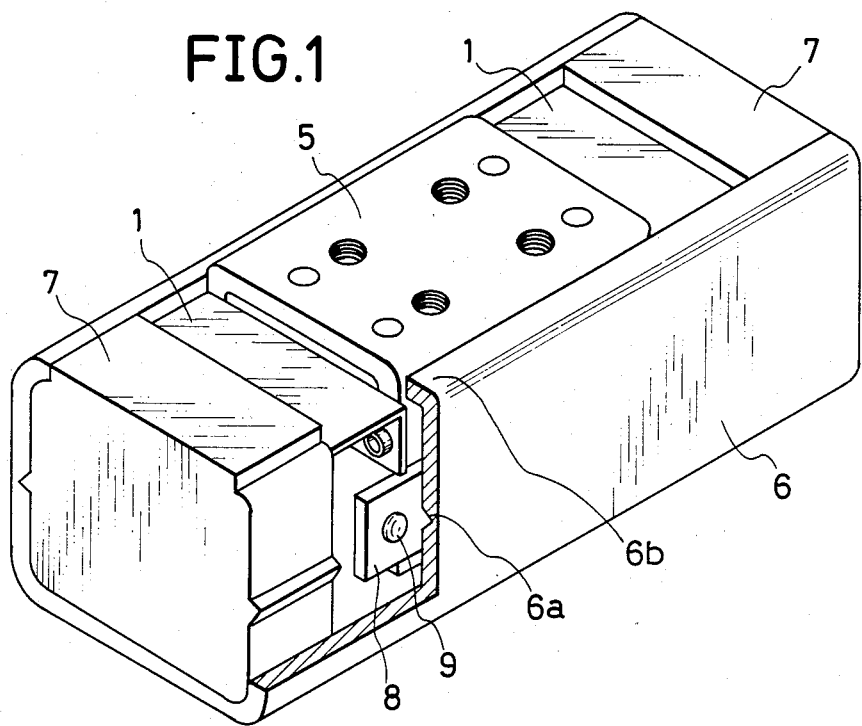
FIG. 1 is a partially cut-away, perspective view showing a dust-free, linear motion rolling-contact bearing assembly constructed in accordance with one embodiment of the present invention.
Figure 2:
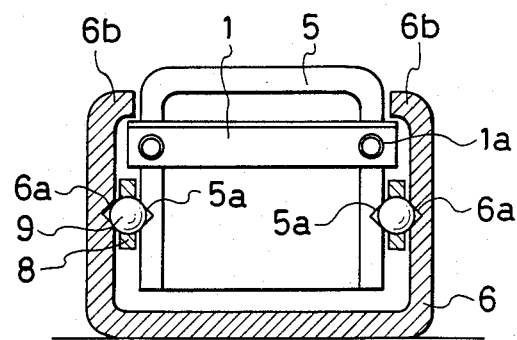
FIG. 2 is a transverse, cross-sectional view of the structure shown in FIG. 1.

Referring now to FIGS. 1-3, there is shown a dust-free, linear motion rolling-contact bearing assembly constructed in accordance with one embodiment of the present invention. As shown, the rolling-contact bearing assembly generally includes a moving table 5 and a track rail 6 along which the moving table 5 moves in a reciprocating manner. As best shown in FIG. 4, the table 5 is generally in the shape of a saddle, and, thus, it has an inverted U-shaped cross section. The table 5 is preferably made by bending a thin steel plate. The table 5 thus has a top flat section and a pair of side wall sections which depend downward from the sides of the top flat section. The top flat section of the table 5 is provided with a plurality of threaded holes for use in fixing a desired object to the table 5. As also shown in FIG. 4, each of the side wall sections of the table 5 is provided with an inner guide groove 5a on its outer surface as extending straight in the horizontal direction.

As shown in FIGS. 1-3, the track rail 6 is elongated in shape and has a predetermined longitudinal length. The track rail 6 is also preferably made by bending a thin steel plate. The track rail 6 has a generally U-shaped cross section and thus it includes a flat bottom section and a pair of side wall sections which extend upright from the sides of the flat bottom section. The side wall sections of the track rail 6 are respectively provided with outer guide grooves 6a, 6a as engraved in the inner surfaces of the side wall sections. As best shown in FIG. 2, when the table 5 is set in position, the inner guide groove 5a of the table 5 is located opposite to the corresponding outer guide groove 6a to define a guide passage therebetween for guiding the movement of the rolling members, i.e., balls 9 in the illustrated embodiment. Thus, a plurality of balls 9 are located between the inner and outer guide grooves 5a and 6a to allow a relative motion between the table 5 and the track rail 6. In the illustrated embodiment, in order to keep the balls 9 spaced apart from each other at an equal interval, there is also provided a ball retainer 8, which is comprised of a rectangular plate provided with a plurality of holes, as interposed between the table 5 and the track rail 6. Such a ball sub-assembly is shown in perspective in FIG. 5 and it is provided on both sides of the table 5 as best shown in FIG. 2.

The track rail 6 is also provided with an inward projection 6b at the top of each of its side wall sections. The inward projection 6b of the illustrated embodiment is formed by bending the top portion of the side wall section inwardly at right angles. In the present embodiment, the inward projection 6b is provided such that its forward end is located close to the side wall section of the table 5 while defining only a predetermined small gap therebetween. Such a gap is preferably made as small as practically possible in order that no undesired foreign matter, such as debris and dust, easily passes therethrough.

A pair of end blocks 7, 7 is also provided each at each end of the track rail 6. The end block 7 is fixedly attached to the corresponding end of the track rail 6, for example, by a screw 7a as shown in FIG. 3 thereby serving as a stopper for limiting the further movement of the table 5 when it comes into engagement therewith. The provision of such end blocks 7, 7 at both ends can provide an increased strength to the track rail 6.

Also provided in the present bearing assembly shown in FIG. 1 is a pair of shield plates 1, 1 each provided at each end of the table 5. The shield plate 1 has its one end fixedly attached to the corresponding end of the table 5 by means of screws 1a and its other end fixedly attached to a spring-biased reel 1b which is located inside of a chamber defined in the end block 7. As indicated by the arrows in FIG. 3, the reels 1b, 1b are rotatably supported and normally biased in opposite directions by means of springs (not shown). Thus, the shield plates 1, 1 are always maintained straight as pulled between the reel 1b and the table 5. Since the reels 1b, 1b are biased to rotate in opposite directions, the pulling forces applied to the table 5 cancel out so that there will be produced no problem in the motion of the table 5 relative to the track rail 6. As best shown in FIG. 2, it is to be noted that the shield plate 1 is wider in width than the distance between the opposed ends of inward projections 6b, 6b and it is located slightly below the inward projections 6b, 6b. More preferably, the shield plate 1 has a width which is slightly less than the distance between the opposed, inner surfaces, of the side wall sections of track rail 6 so that there is defined an extremely small gap between the shield, plate 1 and the side wall sections of track rail 6.

As described above, the present bearing assembly has a completely enclosed structure, and, thus, there is virtually no chance for any undesired foreign matter, such as debris and dust, from getting into the assembly.

Figure 7:
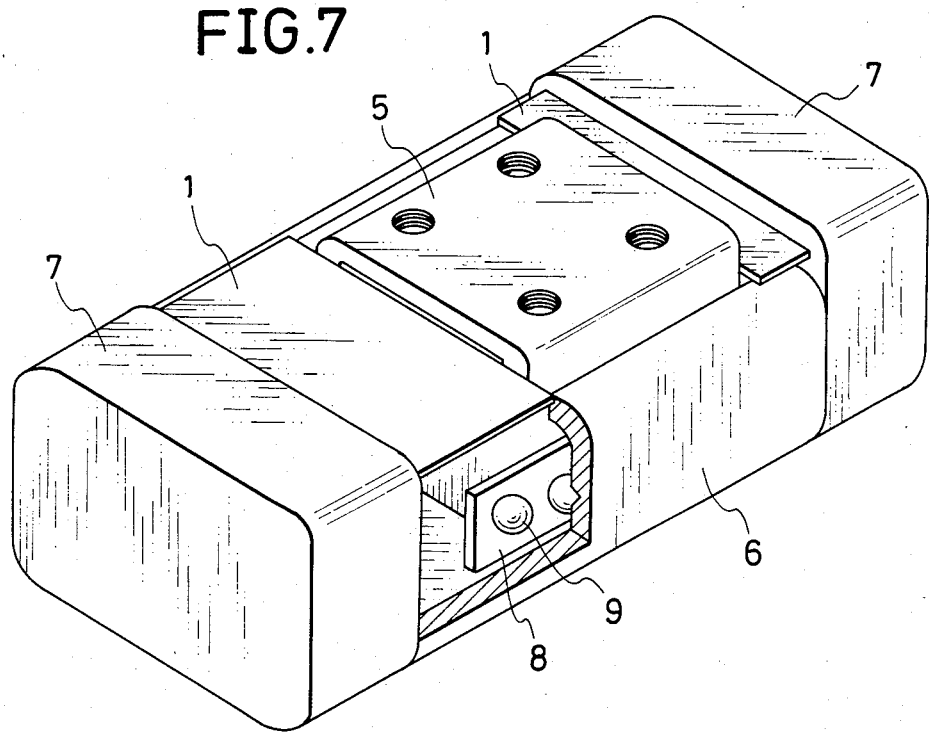
FIG. 7 is a perspective view showing another embodiment of the present invention.
Figure 8:
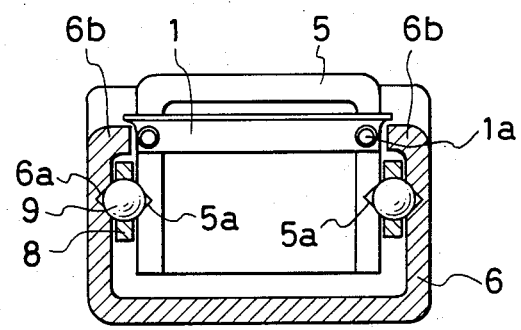
FIG. 8 is a transverse, cross-sectional view of the structure shown in FIG. 7.

Referring now to FIGS. 7 and 8, there is shown another embodiment of the present invention, which is structurally very similar to the embodiment described previously in many respects. In this embodiment, however, the end blocks 7, 7 are formed to extend above the track rail 6 and the shield plates 1, 1 are disposed above the inward projections 6b, 6b of the track rail 6. In the present embodiment, the overlapping region between the shield plate 1 and the inward projection 6b may be increased so that the effect of preventing undesired foreign matter from getting into the bearing assembly may be increased significantly. It will be appreciated that the shield plates 1, 1 may be cleaned more easily in the present embodiment.

While the above provides a full and complete disclosure of the preferred embodiments of the present invention, various modifications, alternate constructions and equivalents may be employed without departing from the true spirit and scope of the invention. For example, although it has been described as to the case where the present invention has been applied to the ball bearing assembly for finite motion, the present invention is equally applicable to other types of bearing assemblies, such as infinite linear motion rolling-contact bearing assemblies including endless circulating paths for moving the rolling members in a circulatory manner. Besides, the present invention is also applicable to those using rollers as the rolling members instead of balls.

Therefore, the above description and illustration should not be construed as limiting the scope of the invention, which is defined by the appended claims.

What is claimed is:

1. A rolling-contact bearing assembly comprising:
   a track rail elongated in shape and including a pair of side wall sections which are placed opposite to each other in parallel as spaced apart over a predetermined distance and a bottom section connecting the bottom ends of said side wall sections;
   a pair of end blocks each fixedly attached to each end of said track rail, said end block covering the corresponding end of said track rail;
   a moving table disposed substantially inside of said track rail as located between said pair of side wall sections;
   a plurality of rolling members interposed between said table and said track rail thereby allowing said table to move along said track rail between said pair of end blocks; wherein said table includes a generally U-shaped cross section comprising a pair of side wall sections oppositely arranged in parallel and a top section connecting the top ends of the pair of side wall sections, whereby an outer guide groove is formed in the inner surface of each of the side wall sections of said track rail and an inner guide groove is formed in the outer surface of each of the side wall sections of said table, said inner and outer guide grooves being oppositely located to define a guide passage in which said rolling members are located; and
   shielding means for uniformly shielding the space between said pair of side wall sections of said track rail to completely enclose the rolling members as said table moves along said track rail, in cooperation with the rail, end blocks, and table.

2. A rolling track bearing assembly having a track rail with first and second ends; a pair of end blocks fixedly attached to said first and second ends of said track rail; a moving table disposed substantially inside of said track rail and moveable therein, and a shielding menas for uniformly shielding and enclosing said rolling contact bearing assembly as said table moves therein, wherein said shielding means includes
   a pair of shield plates each of which has its one end fixedly attached to one end of said table and having its other end fixedly attached to a spring-biased reel rotatably provided in a chamber defined in the corresponding one of said end blocks.

3. The assembly of claim 2 wherein each of said side wall sections of said track rail is provided with an inward projection formed as projecting inwardly over a predetermined distance at its top and said shield plates are wider in width than the distance defined between the forward ends of said inward projections.

4. The assembly of claim 3 wherein said shield plates are provided to extend below said inward projections.

5. The assembly of claim 3 wherein said shield plates are provided to extend above said inward projections.

* * * * *